Oct. 23, 1962

L. E. GOFF 3,059,324

METAL FABRICATION

Filed July 28, 1960

INVENTOR.
LIONEL E. GOFF

ATTORNEYS

Oct. 23, 1962     L. E. GOFF     3,059,324
METAL FABRICATION

Filed July 28, 1960     2 Sheets-Sheet 2

INVENTOR.
LIONEL E. GOFF
BY
ATTORNEYS

United States Patent Office 3,059,324
Patented Oct. 23, 1962

3,059,324
METAL FABRICATION
Lionel E. Goff, Alton, Ill., assignor to Olin Mathieson Chemical Corporation, East Alton, Ill., a corporation of Virginia
Filed July 28, 1960, Ser. No. 45,964
1 Claim. (Cl. 29—157.3)

This invention relates to composite metal structures and more particularly to a method of forming hollow articles by the selective welding of adjacent surfaces of superimposed metal sheets to contain between them an unwelded area adapted for distention into hollow fluid chambers such as employed in heat exchangers, structural panels and the like.

It has been found advantageous to fabricate hollow articles such as refrigerator evaporator panels and the like by the process disclosed in the well known patent to Grenell, U.S. 2,690,002 granted on September 28, 1954. Broadly, in accordance with the aforementioned patent, this is accomplished by selectively welding portions of the adjacent surfaces of superimposed metal component sheets to define between them an internal system of fluid passages complementary to the portions to be welded. More specifically, in accordance with the aforementioned patent, a pattern of weld-inhibiting material, also generally known as stop-weld material is applied to a clean weldable surface of a sheet of metal. A clean weldable surface of a second sheet is superimposed on this surface and the two sheets are suitably secured to prevent relative movement between them, and are then welded together in any suitable manner, as by hot or cold rolling, in the adjacent areas thereof which are not separated by the weld-inhibiting material. Such rolling of the sheets results in reducing the thickness of the sheets and elongating the resultant blank in the direction of rolling while the width of the blank remains substantially the same as the initial width of the sheets.

Following the welding operation, the resultant blank is usually softened as by annealing to make it more pliable, and if desired, it may be further rolled to gauge and again softened as by annealing. The weld-inhibiting material provides between the outer surfaces of the blank an unjoined portion. After softening the blank, the unjoined portion is then distended in any suitable manner as by expansion which involves injecting into the unjoined portion a fluid pressure of sufficient magnitude to permanently distend the blank in the area of the unjoined portion into the desired cross-sectional configuration.

In the above described process, it is necessary that the to-be-juxtaposed surfaces of the sheets, and particularly the welding or faying surfaces of each sheet, be suitably cleaned in order that the welding be successful. It is the practice, when necessary with certain metals to employ various of sealing means in order to prevent access of oxygen, as in air, and other deleterious atmospheres from coming in contact with these faying surfaces in order to maintain them clean and in optimum weldable condition in accordance with the requirements of the aforesaid patent. For example, upon heating of copper, or certain iron based alloys, such as chrome steels, to suitable welding temperatures in the absence of any sealing means, air enters between the adjacent faying surfaces of the superimposed sheets, to oxidize the surfaces causing interference with the welding operation. Although the use of a non-oxidizing atmosphere during the heating operation prevents oxidation of the metal and brings the metal to welding temperatures, the welding surfaces tend to become oxidized during the period of time when the superimposed sheets are transported from the protective atmosphere to the welding means at the welding temperatures.

Various methods have been suggested to overcome the problem of maintaining the faying or welding surfaces of the superimposed sheets clean by preventing oxidation during the transport of the superimposed sheets from the protective atmosphere to the welding means. It has been proposed to prevent oxidation of the faying surfaces during the transport of the sheets by a circumscribing weld around the peripheral edges of the adjacent sheets, by methods such as the heliarc process, which is not only an expensive process, particularly with a low production rate, but is, in addition, time consuming. An alternate method suggested to overcome the oxidation of the faying surfaces is by protection of the panel in a tunnel wherein a suitable protective atmosphere is maintained during its transport between the mouth of the heating furnace and the point of welding. However, the use of an atmosphere tunnel between the point of heating and the welding means presents complex mechanical problems and necessitates machinery which is inherently costly to maintain.

In accordance with this invention an effective seal may be obtained to give effective protection against deleterious and corrosive atmospheres by a weld formed by interposing between the superimposed sheet a continuous band or strip of thermite composition at a point adjacent to and coextending with the peripheral edges of the superimposed sheets so as to circumscribe their faying or welding surfaces and then initiating the reaction of the components of the thermite composition to form the weld. Many and various thermite compositions are known in the art some of which are referred to in U.S. Patent 1,355,224, and some of which are generally known in the art. These thermite compositions include, in addition to mixtures of aluminum with oxides of chromium, with oxides of manganese and oxides of iron, both ferrous and ferric, other mixtures which provide exothermic, self-propagating processes. The thermite compositions of aluminum with the iron oxides are the more widely known particularly in their utilization with the welding of rails. These aluminum-iron oxide thermite compositions may be ignited or fired, to initiate the reaction, in various manners as for example by a fuse of magnesium ribbon or other ignitors such as those disclosed in the aforesaid U.S. Patent 1,355,224. Preferably the initiation of the reaction between components of the thermite composition is effected by means of conventional spot or seam welding equipment whose electrodes are applied to the external portions of the superimposed sheets opposite the thermite composition. After application of the electrodes, of the welding equipment, to the superimposed sheets it is merely necessary to pass sufficient current through the electrodes and the sheets to raise the temperature of the sheets, in the vicinity of the electrodes, to the temperatures necessary for initiating the reaction beween the components of the thermite composition.

In order to adapt the thermite composition for application to metal surfaces, the composition is usually formulated with a binder such as sodium silicate which causes the components of the composition to adhere, both, together and to the surface of the sheet. As is known, a given quantity of the components in the thermite composition gives off a fixed amount of heat, and this heat is utilized in accordance with this invention in raising the temperature of the superimposed sheets to the degree necessary to effect welding between them in the areas between which the thermite composition is sandwiched. In view of the fixed amount of heat given off per fixed quantity of thermite composition, the desired quantity of heat may be readily controlled by means well known in the art as recognized in U.S. Patent 2,515,191. As will be understood the specific amount and proportions of the reactants in the thermite composition necessary for the welding operation will be dependent on the specific application to which the invention is to be put, for example the dimensions of the component sheets to be welded together, such as the thickness, the area between the component sheets to be welded together, the areas between the component sheets to remain unwelded and the external radiating areas from which heat of the thermite reaction will be dissipated by means of radiation and the like. It is only necessary that sufficient quantities and proportions of the thermite mixture be present so as to just melt portions of the adjacent surfaces of the superimposed sheets opposite the thermite mixture after which molten portions will intermix together, including the metal of the thermite reaction, and then coalesce together, upon cooling, to form an integral part of the component sheets. The specific amount of thermite composition necessary to accomplish the welding operation can be readily determined by means well known in the art as indicated in the aforesaid U.S. Patent 2,515,191.

In view of the type of reaction involved in the thermite reaction, the application of the thermite composition to hard-to-weld metals, such as chrome steel, is particularly effective since the aluminum will react with and reduce the chrome oxides of the steel which normally interfere with the welding operation. Similar advantages are obtained when thermite composition is used on conventional iron alloys since it will react with any iron oxides present on the surfaces of the iron alloys. Sometimes, where at least one of the component sheets is composed of metal which will enter into the thermite reaction it may be advantageous to merely provide a reactive oxygen bearing metal in the desired configuration or pattern. For example, if one of these superimposed sheets is an aluminum base metal which enters into the thermite reaction, the thermite composition may be completed by providing a coating of an iron oxide in the pattern or arrangement desired, and the assembly of iron oxide and sheets heated to reaction temperatures since the aluminum sheet provides the aluminum necessary for the thermite reaction.

In addition to the advantages provided in sealing the faying surfaces of superimposed sheets from external sheets, the instant invention also provides a novel method for fabricating hollow articles alternate to that described in the aforementioned Patent 2,690,002. In this alternate method, the thermite composition is provided between the superimposed sheets in a pattern complementary to the internal unjoined area desired between the sheets after welding thereof. For example, if a straight tubular passage is desired between an article fabricated from a pair of superimposed sheets the thermite composition may be applied to the surface of one sheet so as to leave a band on this metal surface devoid of the thermite composition. A second sheet may then be superimposed on the first sheet and the reaction between the components of the thermite composition initiated. As indicated above, a sufficient quantity of the thermite composition is provided so that upon initiation thereof necessary amount of heat will be given off to effect welding in the adjacent areas of the superimposed sheets opposite the thermite composition. Thereafter a suitable entry may be made into the unwelded area between the component sheets and a fluid pressure injected therein of sufficient magnitude to permanently distend the unwelded area into the desired configuration of the tubular passage. As brought out above this reaction may take place in the presence of deleterious atmospheres. However, it is to be understood that where desired, the reaction may take place in protective atmospheres, as for example to protect the external faces of the cover sheets against oxidation.

Accordingly, it is the object of this invention to provide novel means for overcoming disadvantages of the prior art.

Another object of this invention is to provide a novel means for sealing adjacent surfaces of superimposed metal sheets from external atmospheres.

A still another object of this invention is to provide an improved method for the manufacture of composite structures which avoids the formation of oxides on the faying or welding surfaces of superimposed component sheets thereby maintaining the aforesaid surfaces clean for welding operations.

A further object of this invention is to provide a novel method for selectively welding adjacent surfaces of superimposed metal sheets to define between them an internal unjoined area complementary to the said portions.

Other objects and advantages will become more apparent from the following description and drawings in which.

Figure 1:
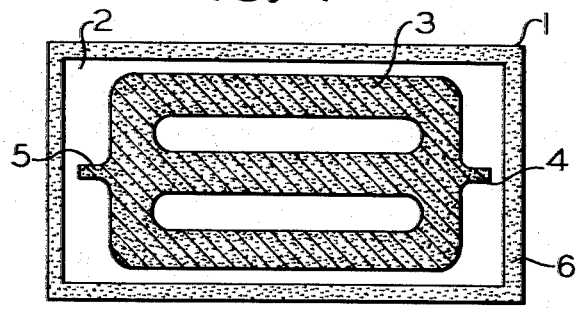
FIGURE 1 is a plan view illustrating a step of one embodiment of this invention illustrating a sheet treated in accordance with this invention employed in the fabrication of hollow articles.
Figure 2:
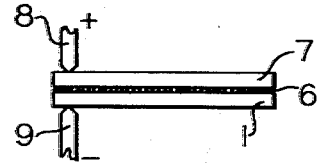
FIGURE 2 illustrates a subsequent step in the treatment of the metal sheet in FIGURE 1 after having superimposed thereon a second component sheet.
Figure 3:
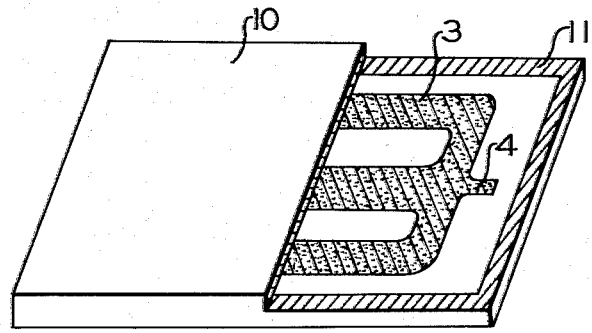
FIGURE 3 is a perspective view partly in section illustrating an intermediate article obtained in accordance with this invention for subsequent processing.
Figure 4:
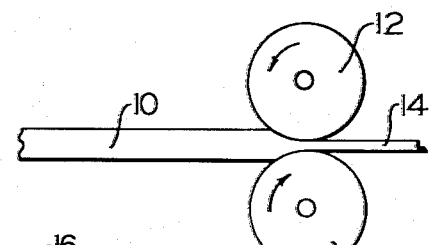
FIGURE 4 is an elevational view illustrating a subsequent step of processing the intermediate article of FIGURE 3.

Referring to the drawings, FIGURE 1 shows a metal sheet 1 which has its surface 2 cleaned in accordance with the aforesaid patent U.S. 2,690,002 and includes an arrangement of a thin layer of weld-inhibiting or stop-weld material 3 disposed in a pattern corresponding to the system of passageways desired in the ultimate article. Any suitable stop-weld or weld-inhibiting material, such as a colloidal suspension of graphite in water, may be employed and applied in a suspension which has a consistency to permit its application by spraying through a masking die, painting through a stencil and/or by squeezing through a silk screen. In order to adapt a system of passageways in the ultimate article with inlet and outlet openings for external connections, the pattern 3 of stop-weld material is provided with the projecting bands or strips of stop-weld material 4 and 5. It is to be understood that only the simplest of patterns of stop-weld material has been shown merely for purposes of illustration since it is well known in the art. Pattern 3 may take any complex configuration, such as waffle or polka dot patterns, generally employed in the fabrication of accumulator sections in evaporator panels, various interconnected passageway designs, and the like.

Prior to the application of pattern 3 on the surface 2 of sheet 1, or preferably, after the application of pattern 3, a continuous peripheral band or strip 6 of a thermite composition, suitably formulated with a binder such as sodium silicate, is applied to surface 2 adjacent to and coextending with peripheral edges of sheet 1 in sufficient quantities which will effect upon initiation of the reactants between the components of thermite composition sufficient heat to weld the portions of sheet 1, on which the composition is applied, to corresponding portions of a second sheet 7 which is to be superimposed on sheet 1. Thereafter sheet 7 is then superimposed on sheet 1 so that a clean weldable surface of sheet 7 will be juxtaposed on the surface of sheet 1 to which the stop-weld material and thermite composition have been applied so as to sandwich them between sheets 1 and 7. The thicknesses of component sheets 1 and 7 may be the same or different and of any dimension desired. The specific charge of the thermite composition is determined by the heat of reaction necessary to accomplish unification of the component sheets and by the permissible or required inherent increase in the composite thickness of the unified component sheets after superimposition and welding. This relationship can be readily determined from information known to the art and if necessary may be supplemented by simple tests. Also, as noted above, where component sheets 1 and 7 are an iron base metal, the thermite composition may comprise both iron oxide and aluminum to provide the reactants necessary. However, where both sheets are of aluminum or where a composite sheet of aluminum and iron is to be formed, it is only necessary that an appropriate amount of iron oxide be provided to form the thermite composition necessary for the welding operation.

Then, while held in the assembled relationship, the superimposed sheets are then placed between a pair of opposed electrodes 8 and 9 of any conventional spot welding equipment so that the electrodes will be disposed in the external faces of the sheets 1 and 7 in the opposite faces of the sheets. Sufficient current is then passed across electrodes 8 and 9 to generate sufficient heat to raise the temperature of the portion of the sheets 1 and 7 abutting the electrodes to the degree necessary for initiating the reaction between the components of the thermite composition 6. As described above, the reaction between the components of thermite composition give off a sufficient amount of heat to melt corresponding opposed portions of sheets 1 and 7, opposite the thermite composition, which will comingle with each other and with the product metal of the thermite reaction and which upon coalescence by cooling form an integral part of the composite structure 10 obtained by this thermite welding operation. This welding operation provides in composite structure 10 a continuous peripheral weld 11 adjacent to and coextending with the peripheral edge of composite structure 10. It is to be understood that although the band 6 of thermite composition is illustrated as extending to the peripheral edge of sheet 1 this band 6 may be spaced from the peripheral edges of sheet 1 provided it is suitably disposed about the pattern 3 of stop-weld material so as to provide the desired barrier between the portions of the metal faying surfaces 2 which are to be welded to corresponding portions of sheet 7 superimposed thereon.

After the component sheets 1 and 7 have been unified in accordance with this invention into composite structure 10, they may be further fabricated in accordance with the aforementioned U.S. Patent 2,690,002 by pressure welding the internal unwelded areas of composite structure 10 which are not separated by the pattern of stop-weld material 3. For example, this pressure welding may be accomplished by rolling between a pair of mill rolls 12 and 13 to obtain a blank 14. Thereafter the blank 14 containing an unjoined interior portion 3', corresponding to pattern 3, may be softened in any appropriate manner as by annealing and further cold rolled to gauge, for example, to provide a more uniform thickness, and again annealed to soften the blank for distention. After the final annealing operation, the blank may be then suitably trimmed to the ultimate dimension desired in any conventional manner such as by shearing. However, it is to be understood that such trimming may be performed at any time subsequent to the pressure welding operation or unification of all the areas not separated by the pattern of stop-weld material 3.

Figure 5:
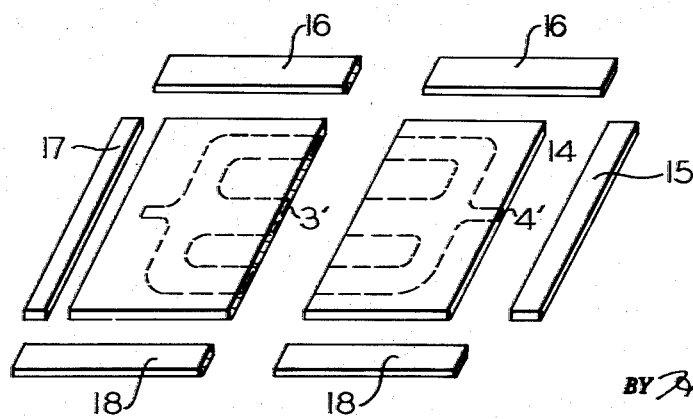
FIGURE 5 is a broken perspective view partly in section illustrating a still further processing step in the treatment of the intermediate article of FIGURE 3.
Figure 6:
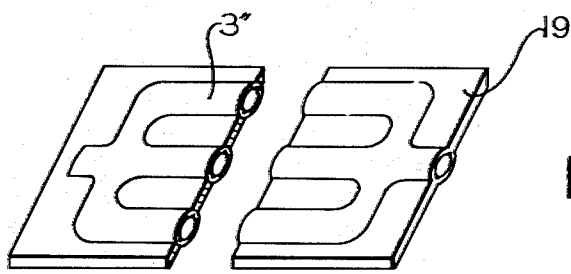
FIGURE 6 is a broken perspective view partly in section illustrating one form of the finished article that may be obtained from the intermediate article of FIGURE 3.

As illustrated in FIGURE 5, the trimmed portions 15, 16, 17 and 18 are separated from the blank 14 with the portion 15 trimmed so as to expose the lamination 4', corresponding to the band or strip of stop-weld 4, in order to provide an inlet for the injection of a fluid pressure and in which a suitable nozzle is secured for the fluid injection. After the trimming operation, the hollow article 19 may be obtained by injecting a fluid, into the unjoined portion 3', under a pressure of sufficient magnitude to distend the unjoined portions into the desired cross-sectional configuration of the passageway system 3", corresponding to the original pattern 3, applied to the component sheet 1. This distention of the unjoined portion 3' may be accomplished freely without restraint, to obtain an oval configuration illustrated, or the distention may be accomplished between opposed rigid flat surfaces which will impart a flat top configuration to the tubular passageway system 3". It is also to be understood that trimmed piece 15 need not expose the lamination 4' since if desired the hollow article 19 may be formed by counterboring through one side of blank 14 to the unjoined portion 3' wherein a suitable connection may be attached and blank 14 distended by application of suitable fluid pressures.

Figure 7:
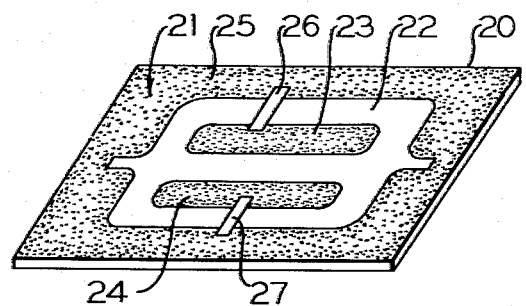
FIGURE 7 is a perspective view of another embodiment of this invention illustrating the treatment of a surface of a metal sheet utilized in the fabrication of a hollow article.
Figure 8:
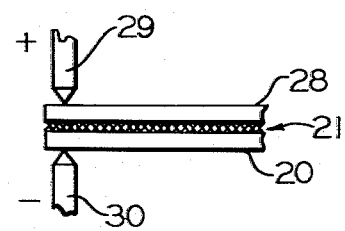
FIGURE 8 illustrates a subsequent step of the treatment of the metal sheet of FIGURE 7 after superimposition of a second component sheet thereon.
Figure 9:
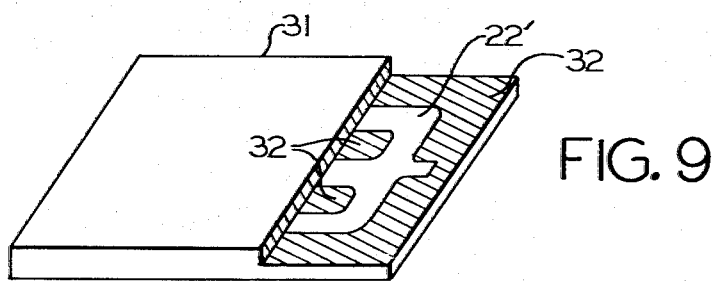
FIGURE 9 is a perspective view partly in section illustrating the product obtained by the treatment illustrated in FIGURE 8.

FIGURE 7 illustrates utilization of this invention in forming the complete hollow article with the thermite composition alone. This is accomplished by applying on the surface of a sheet 20 a thermite composition in a pattern 21 complementary to the system of passageways 22 desired in the ultimate article. Since, to obtain the illustrated system of passageways 22, the complementary pattern of the thermite composition 21 is necessarily formed of portions 23 and 24 which are separated from each other and from the outlining portion 25. In order to provide a means of reacting all of the portions 23, 24 and 25, initiation of the reaction in any and all of the portions may be accomplished by magnesium fuses 26 and 27 bridging the various portions 23, 24 and 25. After application of the pattern of thermite composition 21 on sheet 20, a second sheet 28 is superimposed thereon to sandwich the pattern 21 between them and the reaction between the components of the thermite composition initiated by means of electrodes 29 and 30 in the same manner as in the preceding example or by otherwise supplying heat to initiate the reaction. Upon completion of the reaction the adjacent portions of component sheets 28 become unified in their areas 32 opposite the thermite composition to provide an unjoined portion 22' internally within the intermediate article 31 corresponding to the uncoated portion 22 on the surface of line 20. After formation of intermediate article 31, it may be further processed by rolling to gauge, trimmed, subjected to various annealing treatments and distended in the same manner as in the preceding example.

Although the invention has been described with reference to specific embodiments, materials and details, various modifications and changes, within the scope of this invention, will be apparent to one skilled in the art and are contemplated to be embraced within the invention.

What is claimed is:

A method of forming a hollow article from sheets of metal comprising superimposing metal component sheets having adjacent portions thereof separated by an arrangement of patterns effecting selective welding of said component sheets, said patterns comprising a first pattern of stop-weld material defining a corresponding system of fluid passages and a second pattern of a thermite composition circumscribing said first pattern and applied as a continuous peripheral band of said composition adjacent to and coextending with the peripheral edges of said component sheets, said composition being provided in sufficient quantities to effect upon initiation of the reaction between the components thereof sufficient heat to weld adjacent portions of said sheets opposite said second pattern, initiating the reaction between the components of said composition whereby the heat of said reaction welds said component sheets together in their adjacent portions opposite said second pattern, pressure welding the remaining unwelded adjacent portions of said component sheets in the adjacent areas thereof not separated by said material, and forming said passages by injecting into the unwelded portions between said component sheets corresponding to said first pattern a fluid pressure of sufficient magnitude to distend said unwelded portions into the desired configuration of said passages.

References Cited in the file of this patent

UNITED STATES PATENTS

| | | |
|---|---|---|
| 2,085,191 | Hastins | June 29, 1957 |
| 2,740,188 | Simmons | Apr. 3, 1956 |
| 3,001,277 | Giovannucci | Sept. 26, 1961 |

FOREIGN PATENTS

| | | |
|---|---|---|
| 544,888 | Great Britain | May 1, 1942 |